US011823624B2

(12) United States Patent
Park et al.

(10) Patent No.: US 11,823,624 B2
(45) Date of Patent: Nov. 21, 2023

(54) PIXEL AND DISPLAY DEVICE INCLUDING THE SAME

(71) Applicant: Samsung Display Co., LTD., Yongin-si (KR)

(72) Inventors: Kyoungjin Park, Hwaseong-si (KR); Jongwon Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/964,893

(22) Filed: Oct. 12, 2022

(65) Prior Publication Data

US 2023/0116559 A1 Apr. 13, 2023

(30) Foreign Application Priority Data

Oct. 13, 2021 (KR) ........................ 10-2021-0135676

(51) Int. Cl.

*G06F 1/32* (2019.01)
*G09G 3/3233* (2016.01)
*G09G 3/32* (2016.01)
*G09G 3/3266* (2016.01)

(52) U.S. Cl.

CPC ............. *G09G 3/3233* (2013.01); *G09G 3/32* (2013.01); *G09G 3/3266* (2013.01); *G09G 2300/0842* (2013.01); *G09G 2310/061* (2013.01); *G09G 2320/0233* (2013.01)

(58) Field of Classification Search

CPC ...... G09G 3/3233; G09G 3/32; G09G 3/3266; G09G 2300/0842; G09G 2310/061; G09G 2320/0233; G06F 1/3265
USPC .......................................................... 713/323
See application file for complete search history.

(56) References Cited

U.S. PATENT DOCUMENTS 10,586,496 B2 3/2020 Kim et al.
10,977,998 B2 4/2021 Lee et al.
2016/0124491 A1* 5/2016 An ........................ G06F 1/3265
713/323

FOREIGN PATENT DOCUMENTS

KR 10-2018-0114567 10/2018
KR 10-2019-0046135 5/2019
KR 10-2021-0024326 3/2021

* cited by examiner

*Primary Examiner* — Abdul-Samad A Adediran
(74) *Attorney, Agent, or Firm* — H.C. Park & Associates, PLC

(57) ABSTRACT

A pixel includes a light emitting element, a driving transistor configured to control a driving current provided to the light emitting element, and an initialization transistor configured to provide a first initialization voltage to a gate of the driving transistor, and turned on in response to an initialization gate signal. A voltage level of the first initialization voltage in a blank period of a low-frequency driving mode is higher than a voltage level of the first initialization voltage in the blank period of a high-frequency driving mode.

20 Claims, 8 Drawing Sheets

HFD

PIXEL AND DISPLAY DEVICE INCLUDING THE SAME

CROSS-REFERENCE TO RELATED APPLICATION

This application claims priority from and the benefit of Korean Patent Application No. 10-2021-0135676, filed on Oct. 13, 2021, which is hereby incorporated by reference for all purposes as if fully set forth herein.

BACKGROUND

Field

Embodiments of the invention relate generally to a display device included in various electronic apparatuses.

Discussion of the Background

A display device may include a display panel including a plurality of pixels. Each of the pixels may include a light emitting element configured to emit light, and a driving transistor configured to control a luminance of the light emitted from the light emitting element.

When noise is generated in a signal or a voltage applied to the driving transistor, the luminance of the light emitted from the light emitting element may be changed. When the luminance of the light emitted from the light emitting element is changed, brightness of an image displayed by the display panel may not be uniform.

The above information disclosed in this Background section is only for understanding of the background of the inventive concepts, and, therefore, it may contain information that does not constitute prior art.

SUMMARY

Embodiments provide a pixel in which an initialization transistor is normally operated.

Embodiments provide a display device configured to display an image having uniform brightness.

Additional features of the inventive concepts will be set forth in the description which follows, and in part will be apparent from the description, or may be learned by practice of the inventive concepts.

A pixel according to one embodiment may include a light emitting element; a driving transistor configured to control a driving current provided to the light emitting element; and an initialization transistor configured to provide a first initialization voltage to a gate of the driving transistor, and turned on in response to an initialization gate signal. A voltage level of the first initialization voltage in a blank period of a low-frequency driving mode may be higher than a voltage level of the first initialization voltage in the blank period of a high-frequency driving mode.

In one embodiment, a voltage level of the first initialization voltage in an active period of the low-frequency driving mode may be substantially equal to a voltage level of the first initialization voltage in the active period of the high-frequency driving mode.

In one embodiment, the voltage level of the first initialization voltage in the blank period of the low-frequency driving mode may be higher than a voltage level of the first initialization voltage in an active period of the low-frequency driving mode.

In one embodiment, a difference between the voltage level of the first initialization voltage in the blank period of the low-frequency driving mode and the voltage level of the first initialization voltage in the blank period of the high-frequency driving mode may be substantially equal to a maximum voltage increase amount of the initialization gate signal in the blank period of the low-frequency driving mode.

In one embodiment, a Vgs voltage of the initialization transistor in the blank period of the low-frequency driving mode (where a Vgs voltage is a voltage level difference between a gate and a source) may be substantially equal to a Vgs voltage of the initialization transistor in the blank period of the high-frequency driving mode.

In one embodiment, a driving frequency of the low-frequency driving mode may be less than or equal to 60 Hz, and a driving frequency of the high-frequency driving mode may be greater than or equal to 120 Hz.

In one embodiment, the driving transistor may include a PMOS transistor, and the initialization transistor may include an NMOS transistor.

In one embodiment, the driving transistor may include a polycrystalline silicon transistor, and the initialization transistor includes an oxide semiconductor transistor. In one embodiment, the pixel may further include a write transistor configured to provide a data signal to a source of the driving transistor, and turned on in response to a write gate signal; a compensation transistor connected between a drain and the gate of the driving transistor, and turned on in response to a compensation gate signal; a first emission control transistor connected between a power supply voltage line configured to transmit a first power supply voltage and the source of the driving transistor, and turned off in response to an emission signal; a second emission control transistor connected between the drain of the driving transistor and a first electrode of the light emitting element, and turned off in response to the emission signal; a bypass transistor configured to provide a second initialization voltage to the first electrode of the light emitting element, and turned on in response to a bypass gate signal; and a storage capacitor connected between the gate of the driving transistor and the power supply voltage line.

In one embodiment, each of the write transistor, the first emission control transistor, the second emission control transistor, and the bypass transistor may include a PMOS transistor, and the compensation transistor may include an NMOS transistor.

In one embodiment, each of the write transistor, the first emission control transistor, the second emission control transistor, and the bypass transistor may include a polycrystalline silicon transistor, and the compensation transistor may include an oxide semiconductor transistor.

In one embodiment, the pixel may further include a bias transistor configured to provide a bias voltage to the source or the drain of the driving transistor, and turned on in response to the bypass gate signal.

A display device according to one embodiment may include a display panel including a plurality of pixels; a gate driver configured to provide an initialization gate signal to the pixels; and a power supply configured to provide a first initialization voltage to the pixels. Each of the pixels may include a light emitting element; a driving transistor configured to control a driving current provided to the light emitting element; and an initialization transistor configured to provide the first initialization voltage to a gate of the driving transistor, and turned on in response to the initialization gate signal. A voltage level of the first initialization voltage in a blank period of a low-frequency driving mode may be higher than a voltage level of the first initialization voltage in the blank period of a high-frequency driving mode.

In one embodiment, a voltage level of the first initialization voltage in an active period of the low-frequency driving mode may be substantially equal to a voltage level of the first initialization voltage in the active period of the high-frequency driving mode.

In one embodiment, the voltage level of the first initialization voltage in the blank period of the low-frequency driving mode may be higher than a voltage level of the first initialization voltage in an active period of the low-frequency driving mode.

In one embodiment, a difference between the voltage level of the first initialization voltage in the blank period of the low-frequency driving mode and the voltage level of the first initialization voltage in the blank period of the high-frequency driving mode may be substantially equal to a maximum voltage increase amount of the initialization gate signal in the blank period of the low-frequency driving mode.

In one embodiment, a Vgs voltage of the initialization transistor in the blank period of the low-frequency driving mode (where a Vgs voltage is a voltage level difference between a gate and a source) may be substantially equal to a Vgs voltage of the initialization transistor in the blank period of the high-frequency driving mode.

In one embodiment, a driving frequency of the low-frequency driving mode may be less than or equal to 60 Hz, and a driving frequency of the high-frequency driving mode may be greater than or equal to 120 Hz.

In one embodiment, the display panel may include a main display area and a sub-display area, and a number of the pixels for each line of the main display area may be greater than a number of the pixels for each line of the sub-display area.

In one embodiment, the sub-display area may include a first sub-display area and a second sub-display area, which protrude from the main display area, and a notch area may be formed between the first sub-display area and the second sub-display area.

In the pixel according to embodiments, the initialization transistor may not be turned on in the blank period of the low-frequency driving mode, so that the initialization transistor may be normally operated.

In the display device according to embodiments, the initialization transistor of the pixel disposed in each of the main display area and the sub-display area may not be turned on in the blank period of the low-frequency driving mode, so that the display panel may display an image having uniform brightness.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

Illustrative, non-limiting embodiments will be additionally understood from the following detailed description taken in conjunction with the accompanying drawings.

DETAILED DESCRIPTION OF THE EMBODIMENTS

Figure 1:
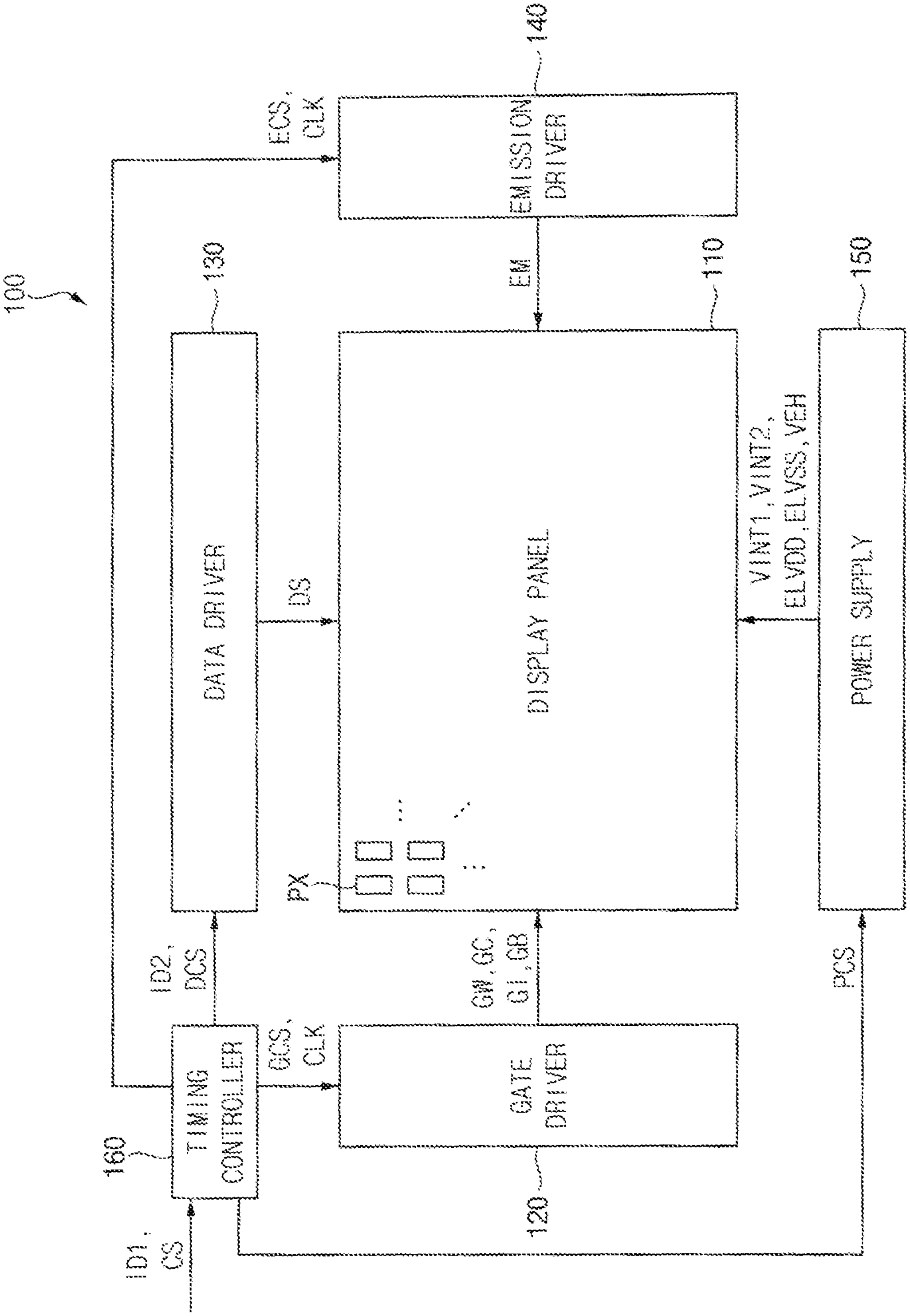
FIG. 1 is a block diagram illustrating a display device according to one embodiment of the inventive concepts.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are illustrated in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, a display device and a pixel according to embodiments of the inventive concepts will be described in more detail with reference to the accompanying drawings. The same or similar reference numerals will be used for the same elements in the accompanying drawings.

FIG. 1 is a block diagram illustrating a display device 100 according to one embodiment of the inventive concepts.

Referring to FIG. 1, a display device 100 may include a display panel 110, a gate driver 120, a data driver 130, an emission driver 140, a power supply 150, and a timing controller 160.

The display panel 110 may include a plurality of pixels PX. The display panel 110 may receive gate signals GW, GC, GI, and GB from the gate driver 120, receive a data signal DS from the data driver 130, receive an emission signal EM from the emission driver 140, and receive voltages VINT1, VINT2, ELVDD, ELVSS, and VEH from the power supply 150. Each of the pixels PX may emit light based on the gate signals GW, GC, GI, and GB, the data signal DS, the emission signal EM, and the voltages VINT1, VINT2, ELVDD, ELVSS, and VEH.

The display panel 110 may display an image by a variable refresh rate (VRR) scheme capable of varying a refresh rate. The refresh rate may represent a frequency of displaying the image from the display panel 110 for 1 second. According to one embodiment, the display panel 110 may display the image at various refresh rates ranging from 1 Hz to 120 Hz. According to another embodiment, the display panel 110 may display the image even at a refresh rate that is greater than 120 Hz (e.g., 240 Hz, 480 Hz, etc.).

The display panel 110 may be driven in a high-frequency driving mode and a low-frequency driving mode according to the refresh rate. According to one embodiment, a driving frequency of the high-frequency driving mode may be greater than or equal to 120 Hz, and a driving frequency of the low-frequency driving mode may be less than or equal to 60 Hz.

The gate driver 120 may receive a gate control signal GCS and a clock signal CLK from the timing controller 160. The gate driver 120 may generate the gate signals GW, GC, GI, and GB based on the gate control signal GCS and the clock signal CLK. The gate driver 120 may provide the gate signals GW, GC, GI, and GB to the pixel PX. The gate signals GW, GC, GI, and GB may include a write gate signal GW, a compensation gate signal GC, an initialization gate signal GI, and a bypass gate signal GB.

The data driver 130 may receive a data control signal DCS and output image data ID2 from the timing controller 160. The data driver 130 may generate the data signal DS based on the data control signal DCS and the output image data ID2. The data driver 130 may provide the data signal DS to the pixel PX.

The emission driver 140 may receive an emission control signal ECS and the clock signal CLK from the timing controller 160. The emission driver 140 may generate the emission signal EM based on the emission control signal ECS and the clock signal CLK. The emission driver 140 may provide the emission signal EM to the pixel PX.

The power supply 150 may receive a power control signal PCS from the timing controller 160. The power supply 150 may provide the voltages VINT1, VINT2, ELVDD, ELVSS, and VEH to the pixel PX. The voltages VINT1, VINT2, ELVDD, ELVSS, and VEH may include a first initialization voltage VINT1, a second initialization voltage VINT2, a first power supply voltage ELVDD, a second power supply voltage ELVSS, and a bias voltage VEH. According to one embodiment, the power supply 150 may increase or decrease a voltage level of the first initialization voltage VINT1 based on the power control signal PCS.

The timing controller 160 may receive input image data ID1 and a control signal CS from an external host processor (e.g., a graphic processing unit (GPU) or a graphic card). The timing controller 160 may generate the gate control signal GCS, the data control signal DCS, the emission control signal ECS, the power control signal PCS, the clock signal CLK, and the output image data ID2 based on the input image data ID1 and the control signal CS.

Figure 2:
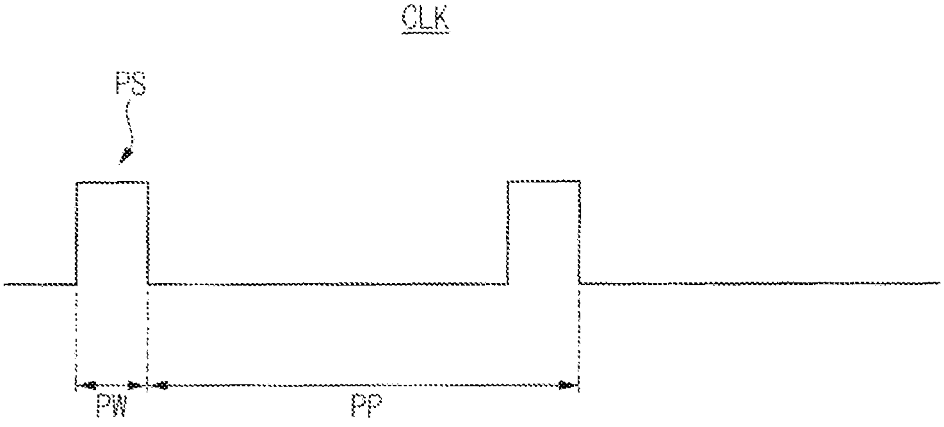
FIG. 2 is a timing diagram illustrating a clock signal according to one embodiment of the inventive concepts.

FIG. 2 is a timing diagram illustrating a clock signal CLK according to one embodiment of the inventive concepts.

Referring to FIG. 2, the clock signal CLK may include pulses PS having a predetermined period PP. When the refresh rate of the display panel 110 decreases, a width PW and/or the period PP of the pulse PS may be increased.

According to one embodiment, a period PP of the pulse PS of the clock signal CLK in the low-frequency driving mode may be greater than a period PP of the pulse PS of the clock signal CLK in the high-frequency driving mode. For example, the period PP of the pulse PS of the clock signal CLK in the high-frequency driving mode may be 4 horizontal times (H), and the period PP of the pulse PS of the clock signal CLK in the low-frequency driving mode may be 240 H. As the width PW and/or the period PP of the pulse PS of the clock signal CLK increases in the low-frequency driving mode, power consumption of the display device 100 may be decreased.

Figure 3:
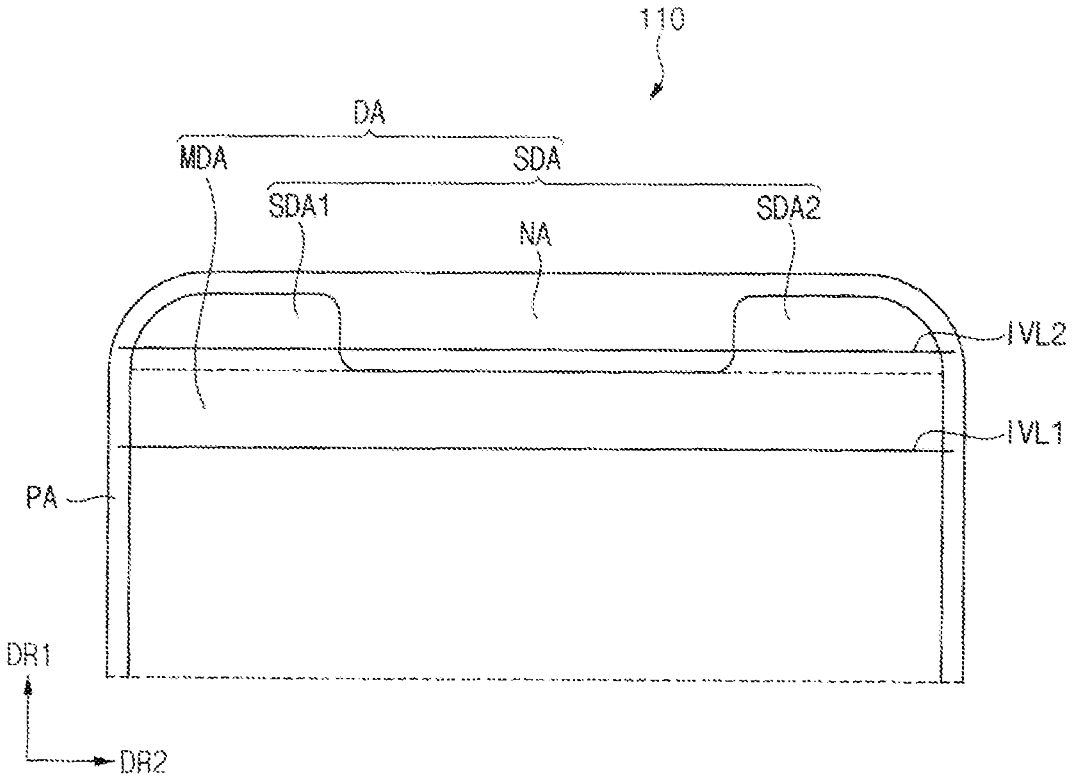
FIG. 3 is a plan view illustrating a display panel according to one embodiment of the inventive concepts.

FIG. 3 is a plan view illustrating a display panel 110 according to one embodiment of the inventive concepts.

Referring to FIG. 3, the display panel 110 may include a display area DA and a peripheral area PA. The pixels PX may be disposed in the display area DA. Accordingly, the display area DA may display an image.

The peripheral area PA may surround at least a part of the display area DA. The peripheral area PA may be a non-display area that does not display an image. According to one embodiment, the gate driver 120 and the emission driver 140 may be disposed in the peripheral area PA. According to another embodiment, the data driver 130 may be additionally disposed in the peripheral area PA.

The display area DA may include a main display area MDA and a sub-display area SDA. The sub-display area SDA may protrude from the main display area MDA. For example, the sub-display area SDA may protrude from the main display area MDA in a first direction DR1.

The sub-display area SDA may include a first sub-display area SDA1 and a second sub-display area SDA2. The second sub-display area SDA2 may be spaced apart from the first sub-display area SDA1 in a second direction DR2 intersecting the first direction DR1. A notch area NA may be formed between the first sub-display area SDA1 and the second sub-display area SDA2. The notch area NA may be included in the peripheral area PA.

A number of the pixels PX for each line of the main display area MDA may be greater than a number of the pixels PX for each line of the sub-display area SDA. According to one embodiment, the number of the pixels PX for each line of the main display area MDA extending in the second direction DR2 may be greater than the number of the pixels PX for each line of the sub-display area SDA extending in the second direction DR2.

A plurality of first initialization voltage lines IVL1 and IVL2 configured to transmit the first initialization voltage VINT1 to the pixels PX may be disposed in the display panel 110. Each of the first initialization voltage lines IVL1 and IVL2 may extend in the second direction DR2, and the first initialization voltage lines IVL1 and IVL2 may be connected to the pixels PX located in pixel rows corresponding to the first initialization voltage lines IVL1 and IVL2, respectively.

Because the number of the pixels PX for each line in the main display area MDA is greater than the number of the pixels PX for each line in the sub-display area SDA, a pixel load of the first initialization voltage line IVL1 disposed in the main display area MDA may be greater than a pixel load of the first initialization voltage line IVL2 disposed in the sub-display area SDA. Accordingly, a voltage drop may occur in the first initialization voltage VINT1 of the main display area MDA, and a magnitude of the first initialization voltage VINT1 of the main display area MDA may be smaller than a magnitude of the first initialization voltage VINT1 of the sub-display area SDA. For example, in the high-frequency driving mode, the first initialization voltage VINT1 of the sub-display area SDA in which the voltage drop does not occur may be about −4.5 V, and the first initialization voltage VINT1 of the main display area MDA in which the voltage drop occurs may be about −4.0 V.

Figure 4:
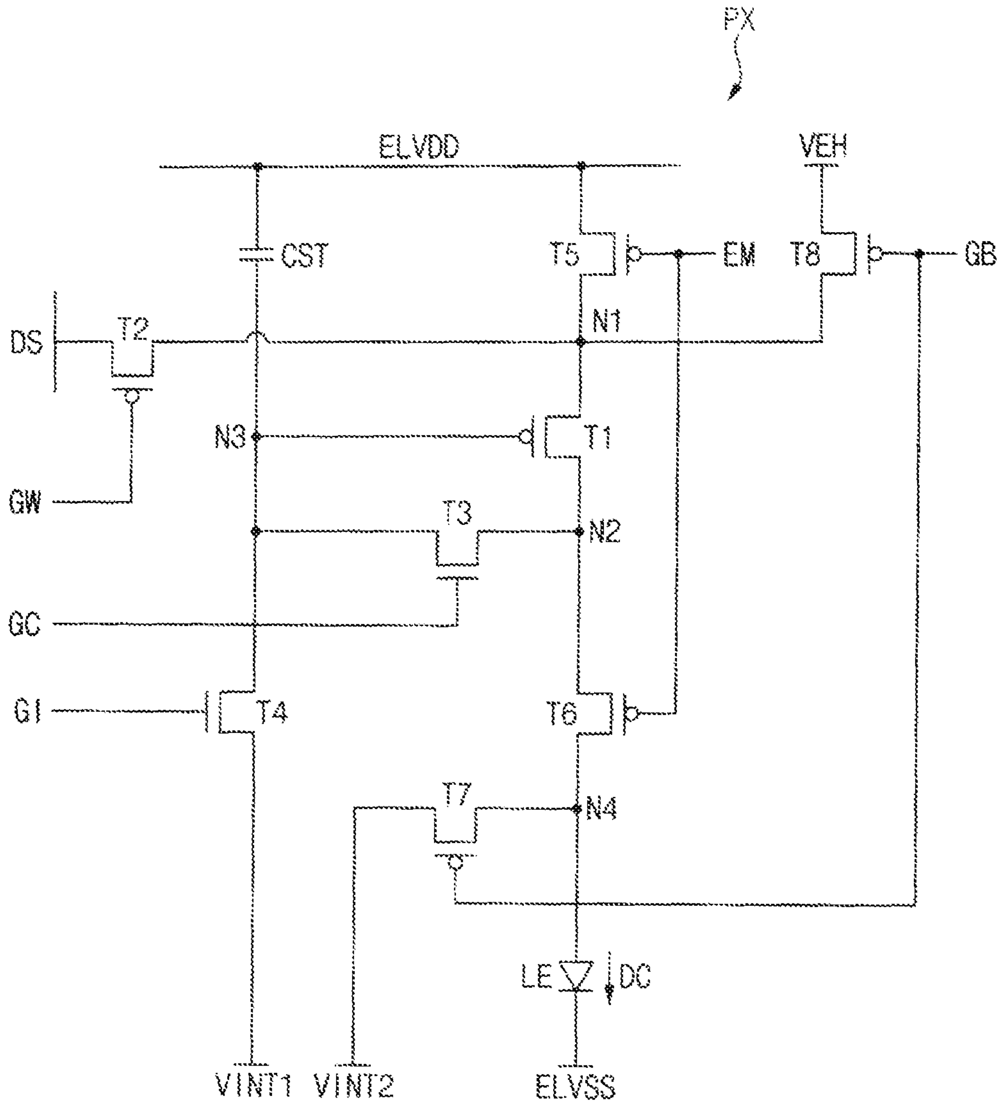
FIG. 4 is a circuit diagram illustrating a pixel according to one embodiment of the inventive concepts.

FIG. 4 is a circuit diagram illustrating a pixel PX according to one embodiment of the inventive concepts.

Referring to FIG. 4, the pixel PX may include a light emitting element LE, a plurality of transistors T1, T2, T3, T4, T5, T6, T7, and T8, and a storage capacitor CST.

The light emitting element LE may be connected between a fourth node N4 and a second power supply voltage line configured to transmit the second power supply voltage ELVSS. A first electrode of the light emitting element LE may be connected to the fourth node N4, and a second electrode of the light emitting element LE may receive the second power supply voltage ELVSS. According to one embodiment, the first electrode and the second electrode of the light emitting element LE may be an anode electrode and a cathode electrode, respectively. The light emitting element LE may emit light based on a driving current DC.

According to one embodiment, the light emitting element LE may be an organic light emitting diode (OLED). According to another embodiment, the light emitting element LE may be an inorganic light emitting diode or a quantum dot light emitting diode.

The transistors T1, T2, T3, T4, T5, T6, T7, and T8 may include a driving transistor T1, a write transistor T2, a compensation transistor T3, an initialization transistor T4, a first emission control transistor T5, a second emission control transistor T6, a bypass transistor T7, and a bias transistor T8.

The driving transistor T1 may be connected between a first node N1 and a second node N2, and may control the driving current DC provided to the light emitting element LE based on a voltage of a third node N3. A source of the driving transistor T1 may be connected to the first node N1, a drain of the driving transistor T1 may be connected to the second node N2, and a gate of the driving transistor T1 may be connected to the third node N3.

The driving transistor T1 may control a current amount of the driving current DC flowing from a first power supply voltage line configured to transmit the first power supply voltage ELVDD to the second power supply voltage line via the light emitting element LE. Accordingly, a voltage level of the first power supply voltage ELVDD may be higher than a voltage level of the second power supply voltage ELVSS.

The write transistor T2 may be connected between a data line configured to transmit the data signal DS and the first node N1, and turned on in response to the write gate signal GW. A source of the write transistor T2 may receive the data signal DS, a drain of the write transistor T2 may be connected to the first node N1, and a gate of the write transistor T2 may receive the write gate signal GW. The write transistor T2 may be turned on when the write gate signal GW is provided so as to transmit the data signal DS to the first node N1.

The compensation transistor T3 may be connected between the second node N2 and the third node N3, and turned on in response to the compensation gate signal GC. A source of the compensation transistor T3 may be connected to the second node N2, a drain of the compensation transistor T3 may be connected to the third node N3, and a gate of the compensation transistor T3 may receive the compensation gate signal GC. The compensation transistor T3 may be turned on when the compensation gate signal GC is provided so as to diode-connect the driving transistor T1. Accordingly, the data signal DS for which a threshold voltage of the driving transistor T1 is compensated may be transmitted to the third node N3.

The initialization transistor T4 may be connected between the first initialization voltage lines IVL1 and IVL2 configured to transmit the first initialization voltage VINT1 and the third node N3, and turned on in response to the initialization gate signal GI. A source of the initialization transistor T4 may receive the first initialization voltage VINT1, a drain of the initialization transistor T4 may be connected to the third node N3, and a gate of the initialization transistor T4 may receive the initialization gate signal GI. The initialization transistor T4 may be turned on when the initialization gate signal GI is provided so as to transmit the first initialization voltage VINT1 to the third node N3. As the first initialization voltage VINT1 is transmitted to the third node N3, the gate of the driving transistor T1 may be initialized.

The first emission control transistor T5 may be connected between the first power supply voltage line and the first node N1, and turned off in response to the emission signal EM. A source of the first emission control transistor T5 may receive the first power supply voltage ELVDD, a drain of the first emission control transistor T5 may be connected to the first node N1, and a gate of the first emission control transistor T5 may receive the emission signal EM.

The second emission control transistor T6 may be connected between the second node N2 and the fourth node N4, and turned off in response to the emission signal EM. A source of the second emission control transistor T6 may be connected to the second node N2, a drain of the second emission control transistor T6 may be connected to the fourth node N4, and a gate of the second emission control transistor T6 may receive the emission signal EM. The first emission control transistor T5 and the second emission control transistor T6 may be turned off in response to the emission signal EM, and turned on when supply of the emission signal EM is stopped.

The bypass transistor T7 may be connected between a second initialization voltage line configured to transmit the second initialization voltage VINT2 and the fourth node N4, and turned on in response to the bypass gate signal GB. A source of the bypass transistor T7 may receive the second initialization voltage VINT2, a drain of the bypass transistor T7 may be connected to the fourth node N4, and a gate of the bypass transistor T7 may receive the bypass gate signal GB.

The bypass transistor T7 may be turned on when the bypass gate signal GB is provided so as to transmit the second initialization voltage VINT2 to the first electrode of the light emitting element LE. When the second initialization voltage VINT2 is transmitted to the first electrode of the light emitting element LE, a parasitic capacitor of the light emitting element LE may be discharged. As a residual voltage charged in the parasitic capacitor is discharged, exiguous light emission of the light emitting element LE may be prevented from unintentionally caused.

The bias transistor T8 may be connected between a bias voltage line configured to transmit the bias voltage VEH and the first node N1, and turned on in response to the bypass gate signal GB. A source of the bias transistor T8 may receive the bias voltage VEH, a drain of the bias transistor T8 may be connected to the first node N1, and a gate of the bias transistor T8 may receive the bypass gate signal GB.

The bias transistor T8 may be turned on when the bypass gate signal GB is provided so as to transmit the bias voltage VEH to the source of the driving transistor T1. As the bias voltage VEH is applied to the source of the driving transistor T1, the driving transistor T1 may be on-biased, and a hysteresis of the driving transistor T1 may be compensated for.

According to one embodiment, each of the driving transistor T1, the write transistor T2, the first emission control transistor T5, the second emission control transistor T6, the bypass transistor T7, and the bias transistor T8 may be a PMOS transistor, and each of the compensation transistor T3 and the initialization transistor T4 may be an NMOS transistor. Accordingly, a gate-on voltage that turns on the driving transistor T1, the write transistor T2, the first emission control transistor T5, the second emission control transistor T6, the bypass transistor T7, and the bias transistor T8 may be a logic low voltage, and a gate-on voltage that turns on the compensation transistor T3 and the initialization transistor T4 may be a logic high voltage.

According to one embodiment, each of the driving transistor T1, the write transistor T2, the first emission control transistor T5, the second emission control transistor T6, the bypass transistor T7, and the bias transistor T8 may be a polycrystalline silicon transistor, and each of the compensation transistor T3 and the initialization transistor T4 may be an oxide semiconductor transistor. In other words, each of the driving transistor T1, the write transistor T2, the first emission control transistor T5, the second emission control transistor T6, the bypass transistor T7, and the bias transistor T8 may include an active layer formed of polycrystalline silicon, and each of the compensation transistor T3 and the initialization transistor T4 may include an active layer formed of an oxide semiconductor.

The storage capacitor CST may be connected between the third node N3 and the first power supply voltage line. A first electrode of the storage capacitor CST may be connected to the third node N3, and a second electrode of the storage capacitor CST may receive the first power supply voltage ELVDD.

Figure 5:
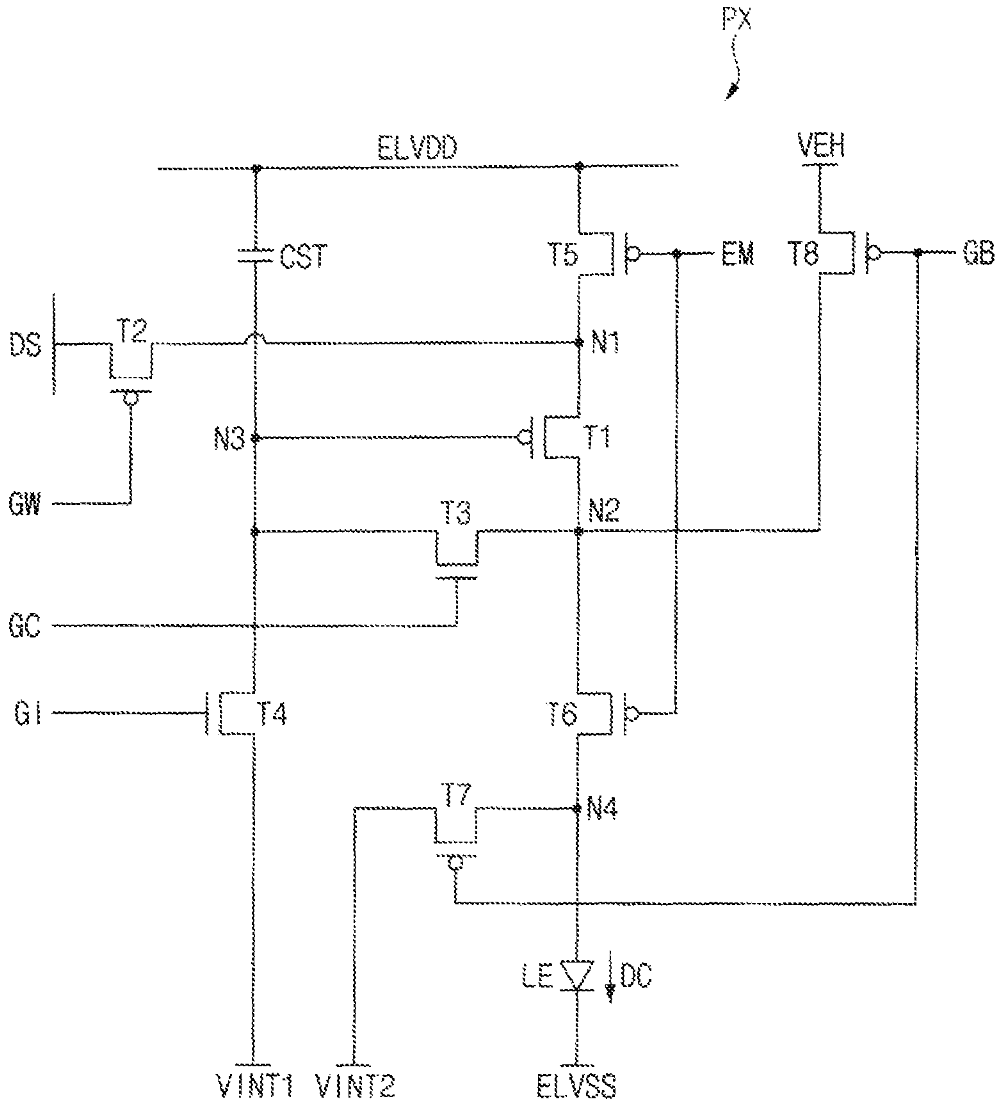
FIG. 5 is a circuit diagram illustrating a pixel according to another embodiment of the inventive concepts.

FIG. 5 is a circuit diagram illustrating a pixel PX according to another embodiment of the inventive concepts.

Referring to FIG. 5, the pixel PX may include a light emitting element LE, a plurality of transistors T1, T2, T3, T4, T5, T6, T7, and T8, and a storage capacitor CST. The pixel PX that will be described with reference to FIG. 5 may be substantially identical to the pixel PX described with reference to FIG. 4 except for connection of the bias transistor T8. Accordingly, redundant descriptions of components will be omitted.

The bias transistor T8 may be connected between a bias voltage line configured to transmit the bias voltage VEH and the second node N2, and turned on in response to the bypass gate signal GB. A source of the bias transistor T8 may receive the bias voltage VEH, a drain of the bias transistor T8 may be connected to the second node N2, and a gate of the bias transistor T8 may receive the bypass gate signal GB.

The bias transistor T8 may be turned on when the bypass gate signal GB is provided so as to transmit the bias voltage VEH to the drain of the driving transistor T1. As the bias voltage VEH is applied to the drain of the driving transistor T1, the driving transistor T1 may be on-biased, and a hysteresis of the driving transistor T1 may be compensated for.

Figure 6:
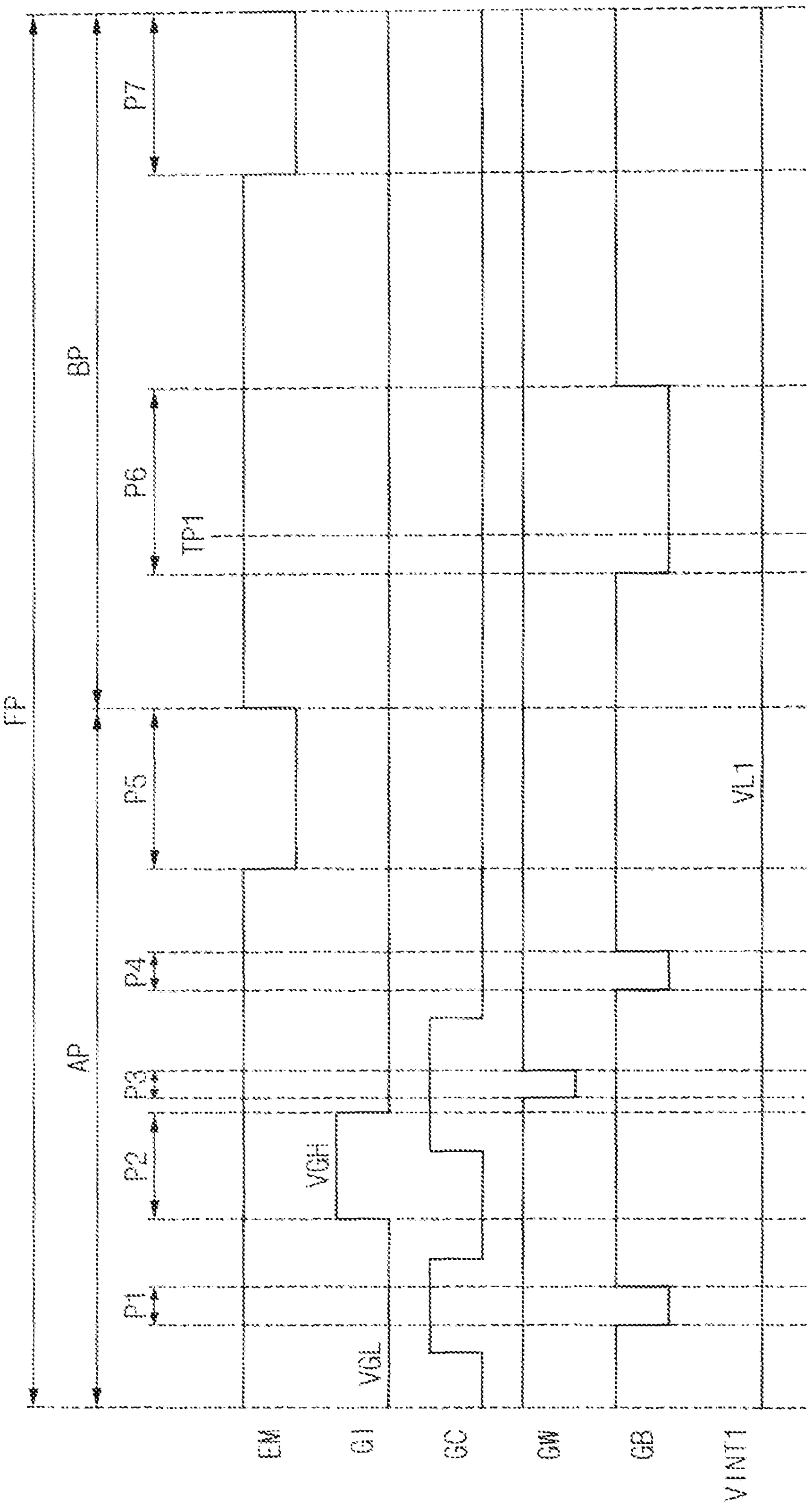
FIG. 6 is a timing diagram illustrating driving of a pixel in a high-frequency driving mode according to one embodiment of the inventive concepts.

FIG. 6 is a timing diagram illustrating driving of the pixel PX in a high-frequency driving mode HFD according to one embodiment of the inventive concepts.

Referring to FIGS. 4, 5, and 6, a frame period FP may include an active period AP and at least one blank period BP.

The pixel PX may receive signals configured to display an image in the active period AP. The active period AP may include an off-bias period P1, an initialization period P2, a compensation and write period P3, a bypass period P4, and a first emission period P5.

First, the emission signal EM may be applied to the pixel PX. When the emission signal EM is applied, the first emission control transistor T5 and the second emission control transistor T6 may be turned off. When the first emission control transistor T5 and the second emission control transistor T6 are turned off, supply of the driving current DC to the light emitting element LE may be stopped.

Next, the compensation gate signal GC and the bypass gate signal GB may be applied to the pixel PX in the off-bias period P1. When the compensation gate signal GC is applied, the compensation transistor T3 may be turned on, and when the bypass gate signal GB is applied, the bypass transistor T7 and the bias transistor T8 may be turned on. When the compensation transistor T3 and the bias transistor T8 are turned on, the bias voltage VEH may be applied to the gate of the driving transistor T1, and the driving transistor T1 may be off-biased. When the bypass transistor T7 is turned on, the second initialization voltage VINT2 may be provided to the first electrode of the light emitting element LE, and a voltage of the parasitic capacitor of the light emitting element LE may be discharged.

Next, the initialization gate signal GI may be applied to the pixel PX in the initialization period P2. When the initialization gate signal GI is applied, the initialization transistor T4 may be turned on. When the initialization transistor T4 is turned on, the first initialization voltage VINT1 may be applied to the gate of the driving transistor T1, and the gate of the driving transistor T1 may be initialized.

For example, a voltage level of a logic low voltage VGL of the initialization gate signal GI that turns off the initialization transistor T4 may be about −8 V, and a voltage level of a logic high voltage VGH of the initialization gate signal GI that turns on the initialization transistor T4 may be about 6.5 V.

Next, the compensation gate signal GC and the write gate signal GW may be applied to the pixel PX in the compensation and write period P3. When the compensation gate signal GC is applied, the compensation transistor T3 may be turned on, and when the write gate signal GW is applied, the write transistor T2 may be turned on. When the compensation transistor T3 and the write transistor T2 are turned on, the data signal DS for which the threshold voltage of the driving transistor T1 is compensated may be provided to the gate of the driving transistor T1.

Next, the bypass gate signal GB may be applied to the pixel PX in the bypass period P4. When the bypass gate signal GB is applied, the bypass transistor T7 and the bias transistor T8 may be turned on. When the bypass transistor T7 is turned on, the second initialization voltage VINT2 may be provided to the first electrode of the light emitting element LE, and the voltage of the parasitic capacitor of the light emitting element LE may be discharged. When the bias transistor T8 is turned on, the bias voltage VEH may be applied to the source or the drain of the driving transistor T1, and the driving transistor T1 may be on-biased.

Next, the supply of the emission signal EM to the pixel PX may be stopped in the first emission period P5. When the supply of the emission signal EM is stopped, the first emission control transistor T5 and the second emission control transistor T6 may be turned on. When the first emission control transistor T5 and the second emission control transistor T6 are turned on, the driving current DC generated based on the data signal DS may be provided to the light emitting element LE, and the light emitting element LE may emit the light with a luminance corresponding to the driving current DC.

The pixel PX may receive signals configured to maintain a luminance of the image displayed in the active period AP in the blank period BP. The blank period BP may include an on-bias period P6 and a second emission period P7.

First, the emission signal EM may be applied to the pixel PX. When the emission signal EM is applied, the first emission control transistor T5 and the second emission control transistor T6 may be turned off. When the first emission control transistor T5 and the second emission control transistor T6 are turned off, the supply of the driving current DC to the light emitting element LE may be stopped.

Next, the bypass gate signal GB may be applied to the pixel PX in the bias period P6. When the bypass gate signal GB is applied, the bypass transistor T7 and the bias transistor T8 may be turned on. When the bypass transistor T7 is turned on, the second initialization voltage VINT2 may be provided to the first electrode of the light emitting element LE, and the voltage of the parasitic capacitor of the light emitting element LE may be discharged. When the bias transistor T8 is turned on, the bias voltage VEH may be applied to the source or the drain of the driving transistor T1, and the driving transistor T1 may be on-biased.

Next, the supply of the emission signal EM to the pixel PX may be stopped in the second emission period P7. When the supply of the emission signal EM is stopped, the first emission control transistor T5 and the second emission control transistor T6 may be turned on. When the first emission control transistor T5 and the second emission control transistor T6 are turned on, the light emitting element LE may emit the light based on the data signal DS provided in the active period AP.

Figure 7:
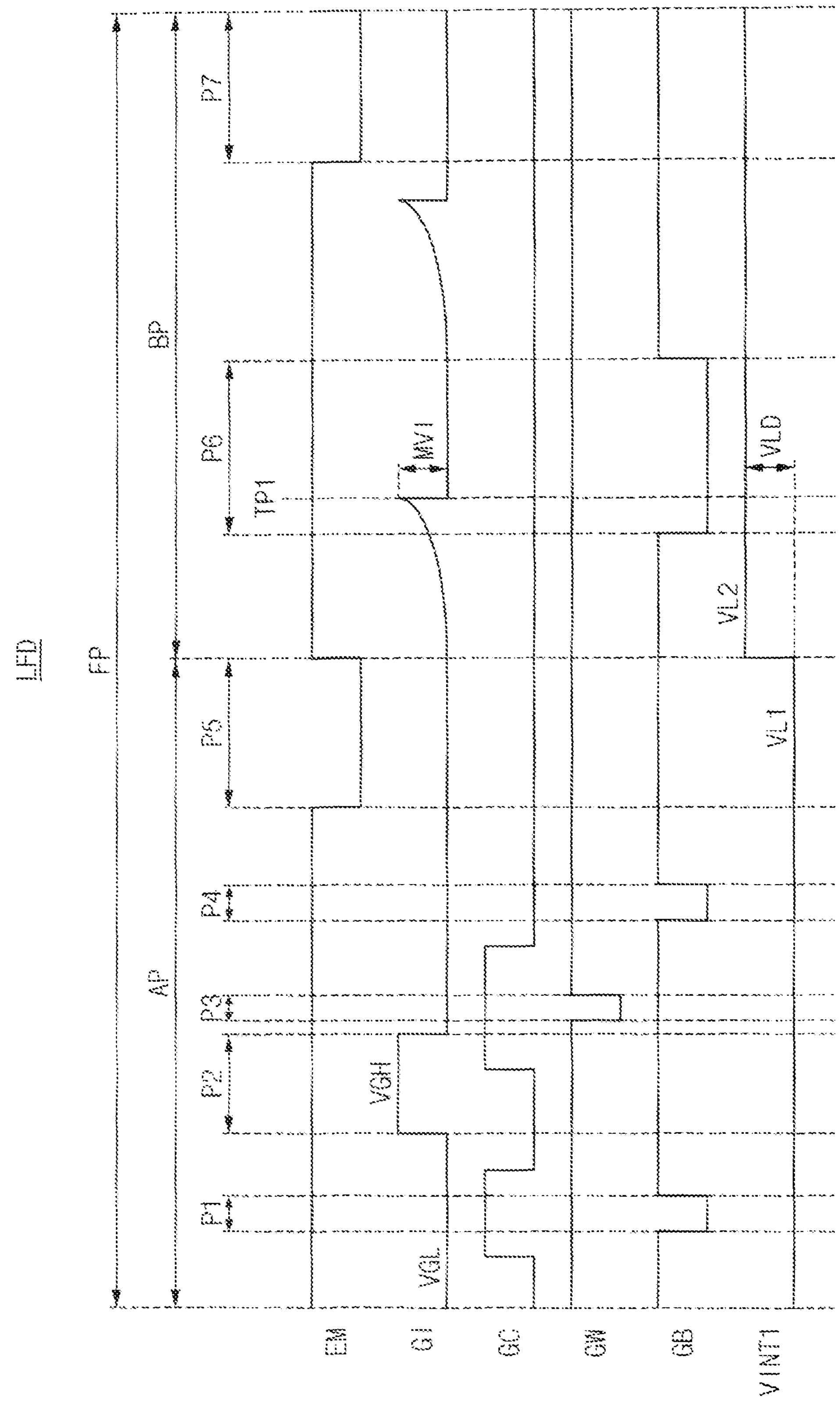
FIG. 7 is a timing diagram illustrating driving of a pixel in a low-frequency driving mode according to one embodiment of the inventive concepts.

FIG. 7 is a timing diagram illustrating driving of the pixel PX in a low-frequency driving mode LFD according to one embodiment of the inventive concepts.

According to driving of the pixel PX in a low-frequency driving mode LFD that will be described with reference to FIG. 7, descriptions of components that are substantially identical or similar to the components of driving of the pixel PX in a high-frequency driving mode HFD described with reference to FIG. 6 will be omitted.

Referring to FIGS. 4, 5, 6, and 7, a voltage level of the initialization gate signal GI may be constant in the blank period BP of the high-frequency driving mode HFD, and the voltage level of the initialization gate signal GI may be periodically changed in the blank period BP of the low-frequency driving mode LFD. According to one embodiment, the initialization gate signal GI in the blank period BP of the low-frequency driving mode LFD may repeatedly perform a pattern of exponentially increasing from a voltage level of the logic low voltage VGL and dropping to the voltage level of the logic low voltage VGL. For example, a maximum voltage increase amount MVI of the initialization gate signal GI in the blank period BP of the low-frequency driving mode LFD may be about 1.0 V.

The initialization gate signal GI in the blank period BP may maintain the constant voltage level by the pulse PS of the clock signal CLK. The voltage level of the initialization gate signal GI may not be increased because the period PP of the pulse PS of the clock signal CLK is small in the blank period BP of the high-frequency driving mode HFD, whereas the voltage level of the initialization gate signal GI may be periodically increased because the period PP of the pulse PS of the clock signal CLK is large in the blank period BP of the low-frequency driving mode LFD.

When the voltage level of the initialization gate signal GI increases in the blank period BP of the low-frequency driving mode LFD, a voltage level of the gate of the initialization transistor T4 may be increased, so that a Vgs voltage (a voltage level difference between a gate and a source) of the initialization transistor T4 may be increased. In particular, because a voltage drop does not occur in the first initialization voltage VINT1 provided to the pixel PX disposed in the sub-display area SDA, when the voltage level of the initialization gate signal GI increases in the blank period BP of the low-frequency driving mode LFD, a Vgs voltage of the initialization transistor T4 of the pixel PX disposed in the sub-display area SDA may be further increased. When the Vgs voltage of the initialization transistor T4 increases, the initialization transistor T4 may be turned on so as to apply the first initialization voltage VINT1 to the gate of the driving transistor T1 in the blank period BP, so that brightness of light emitted from the pixel PX may be increased. In particular, when brightness of light emitted from the pixel PX disposed in the sub-display area SDA increases, brightness of an image displayed in the sub-display area SDA may be greater than brightness of an image displayed in the main display area MDA.

In order to prevent the initialization transistor T4 from being turned on in the blank period BP of the low-frequency driving mode LFD, a voltage level VL2 of the first initialization voltage VINT1 in the blank period BP of the low-frequency driving mode LFD may be higher than a voltage level VL1 of the first initialization voltage VINT1 in the blank period BP of the high-frequency driving mode HFD. For example, the voltage level VL2 of the first initialization voltage VINT1 in the blank period BP of the low-frequency driving mode LFD may be about −3.5 V, and the voltage level VL1 of the first initialization voltage VINT1 in the blank period BP of the high-frequency driving mode HFD may be about −4.5 V.

According to one embodiment, a difference VLD between the voltage level VL2 of the first initialization voltage VINT1 in the blank period BP of the low-frequency driving mode LFD and the voltage level VL1 of the first initialization voltage VINT1 in the blank period BP of the high-frequency driving mode HFD may be substantially equal to the maximum voltage increase amount MVI of the initialization gate signal GI in the blank period BP of the low-frequency driving mode LFD. According to the above embodiment, because an increase amount VLD of a voltage level of the source of the initialization transistor T4 in the blank period BP of the low-frequency driving mode LFD is substantially equal to the increase amount MVI of the voltage level of the gate of the initialization transistor T4, a Vgs voltage of the initialization transistor T4 at a first time point TP1 in the blank period BP of the low-frequency driving mode LFD may be substantially equal to a Vgs voltage of the initialization transistor T4 at the first time point TP1 in the blank period BP of the high-frequency driving mode HFD.

Even when the voltage level of the gate of the initialization transistor T4 is increased as the voltage level of the initialization gate signal GI increases in the blank period BP of the low-frequency driving mode LFD, because the voltage level of the source of the initialization transistor T4 is increased as the voltage level of the first initialization voltage VINT1 increases, the Vgs voltage of the initialization transistor T4 may not be increased. In particular, even when the voltage drop does not occur in the first initialization voltage VINT1 provided to the pixel PX disposed in the sub-display area SDA, because the voltage level of the first initialization voltage VINT1 is increased in the blank period BP of the low-frequency driving mode LFD, the Vgs voltage of the initialization transistor T4 of the pixel PX disposed in the sub-display area SDA may not be increased. Accordingly, the brightness of the light emitted from the pixel PX disposed in the sub-display area SDA may be substantially equal to the brightness of the image displayed in the main display area MDA.

A voltage level VL1 of the first initialization voltage VINT1 in the active period AP of the low-frequency driving mode LFD may be substantially equal to a voltage level VL1 of the first initialization voltage VINT1 in the active period AP of the high-frequency driving mode HFD. For example, the voltage level VL1 of the first initialization voltage VINT1 in the active period AP of the low-frequency driving mode LFD may be about −4.5 V, and the voltage level VL1 of the first initialization voltage VINT1 in the active period AP of the high-frequency driving mode HFD may be about −4.5 V. Accordingly, the initialization transistor T4 may be normally turned on in the initialization period P2 of the active period AP of the low-frequency driving mode LFD, so that the gate of the driving transistor T1 may be normally initialized.

The voltage level VL2 of the first initialization voltage VINT1 in the blank period BP of the low-frequency driving mode LFD may be higher than the voltage level VL1 of the first initialization voltage VINT1 in the active period AP of the low-frequency driving mode LFD. For example, the voltage level VL2 of the first initialization voltage VINT1 in the blank period BP of the low-frequency driving mode LFD may be about −3.5 V, and the voltage level VL1 of the first initialization voltage VINT1 in the active period AP of the low-frequency driving mode LFD may be about −4.5 V. According to one embodiment, when switching from the active period AP to the blank period BP in the low-frequency driving mode LFD, the first initialization voltage VINT1 may be increased from a first voltage level VL1 to a second voltage level VL2.

TABLE 1

| Comparative example | Sub-display area | Main display area |
|---|---|---|
| High-frequency driving mode | −8 − (−4.5) = −3.5 (V) | −8 − (−4.0) = −4.0 (V) |
| Low-frequency driving mode | −7 − (−4.5) = −2.5 (V) | −7 − (−4.0) = −3.0 (V) |

TABLE 2

| Embodiment | Sub-display area | Main display area |
|---|---|---|
| High-frequency driving mode | −8 − (−4.5) = −3.5 (V) | −8 − (−4.0) = −4.0 (V) |
| Low-frequency driving mode | −7 − (−3.5) = −3.5 (V) | −7 − (−3.0) = −4.0 (V) |

Figure 8:
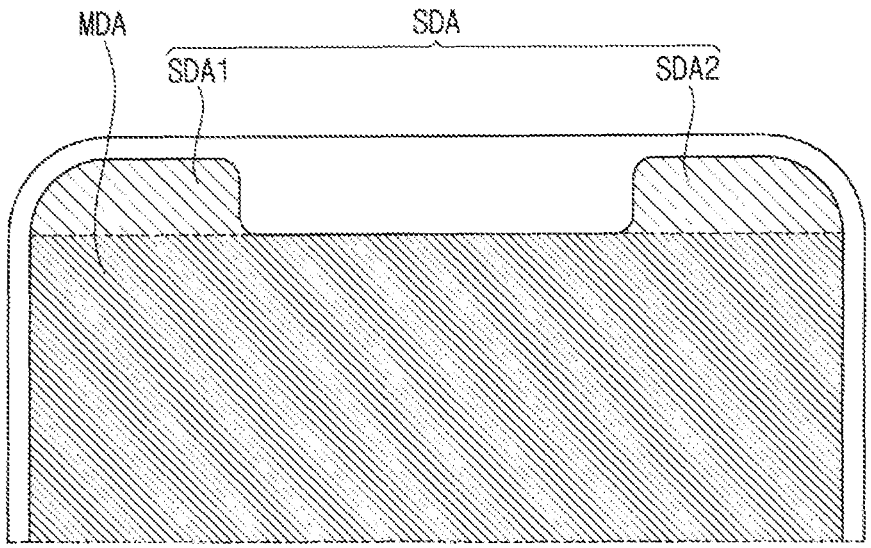
FIG. 8 is a plan view illustrating a display panel in a blank period of a low-frequency driving mode according to a comparative example of the inventive concepts.
Figure 9:
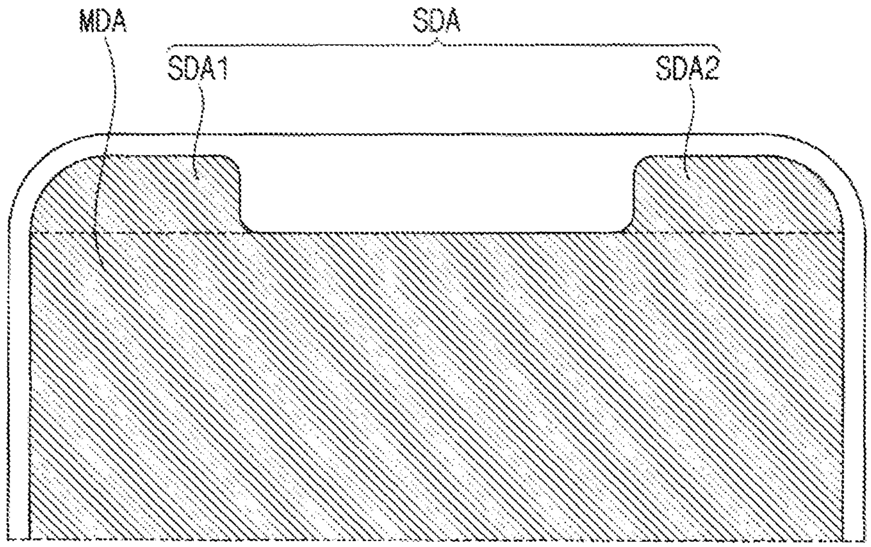
FIG. 9 is a plan view illustrating the display panel in a blank period of a low-frequency driving mode according to an embodiment of the inventive concepts.

Table 1 illustrates a Vgs voltage of an initialization transistor of a pixel at a first time point TP1 in a blank period BP according to a comparative example of the inventive concepts. Table 2 illustrates the Vgs voltage of the initialization transistor of the pixel at the first time point TP1 in the blank period BP according to an embodiment of the inventive concepts. FIG. 8 is a plan view illustrating a display panel in a blank period BP of a low-frequency driving mode LFD according to a comparative example of the inventive concepts. FIG. 9 is a plan view illustrating the display panel in a blank period BP of the low-frequency driving mode LFD according to an embodiment of the inventive concepts.

Referring to Table 1, Table 2, FIG. 8, and FIG. 9, according to a comparative example and an embodiment, a voltage level of the Vgs voltage of the initialization transistor of the pixel of each of the sub-display area SDA and the main display area MDA may be relatively low in the blank period of the high-frequency driving mode. Accordingly, according to the comparative example and the embodiment, the initialization transistor of the pixel of each of the sub-display area SDA and the main display area MDA may be normally turned off in the blank period of the high-frequency driving mode.

According to the comparative example, in the blank period of the low-frequency driving mode, as a voltage level of an initialization gate signal increases, the voltage level of the Vgs voltage of the initialization transistor of the pixel of each of the sub-display area SDA and the main display area MDA may be relatively high. In particular, as a voltage drop of a first initialization voltage of the sub-display area SDA does not occur, the voltage level of the Vgs voltage of the initialization transistor of the pixel of the sub-display area SDA may be higher in the blank period of the low-frequency driving mode. Accordingly, according to the comparative example, the initialization transistor of the pixel of the sub-display area SDA may be abnormally turned on in the blank period of the low-frequency driving mode. Therefore, according to the comparative example, in the blank period of the low-frequency driving mode, brightness of an image displayed in the sub-display area SDA may be greater than brightness of an image displayed in the main display area MDA.

According to the embodiment, as the voltage level of the first initialization voltage increases, the voltage level of the Vgs voltage of the initialization transistor of the pixel of each of the sub-display area SDA and the main display area MDA may be relatively low in the blank period of the low-frequency driving mode. Accordingly, according to the embodiment, the initialization transistor of the pixel of each of the sub-display area SDA and the main display area MDA may be normally turned off in the blank period of the low-frequency driving mode. Therefore, according to the embodiment, in the blank period of the low-frequency driving mode, the brightness of the image displayed in the sub-display area SDA may be substantially equal to the brightness of the image displayed in the main display area MDA.

Figure 10:
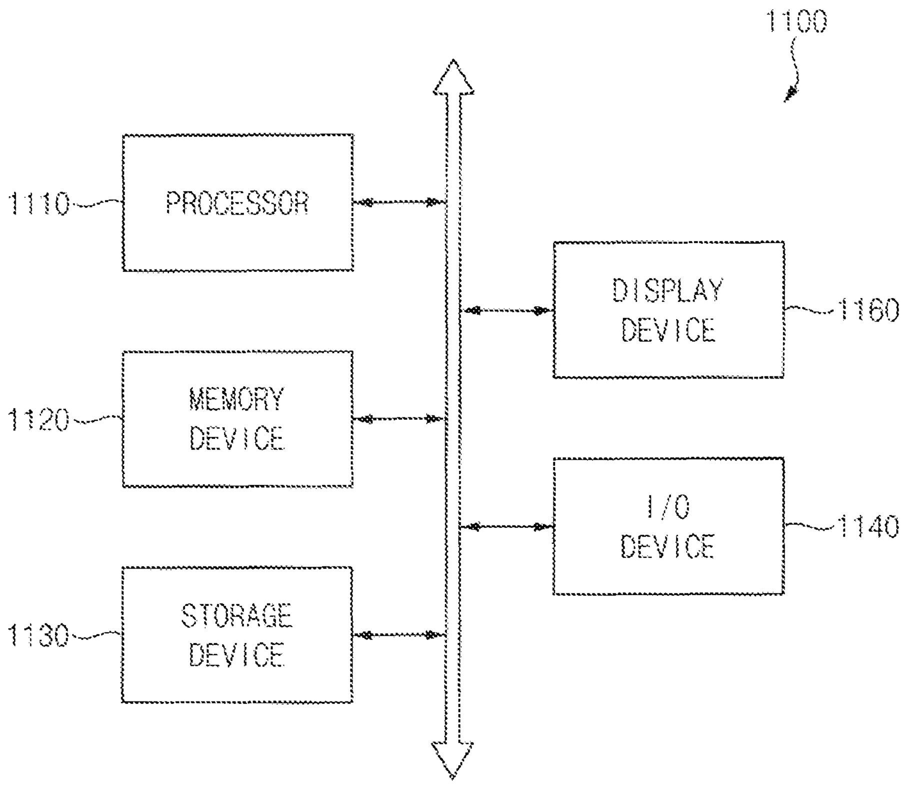
FIG. 10 is a block diagram illustrating an electronic device including a display device according to one embodiment of the inventive concepts.

FIG. 10 is a block diagram illustrating an electronic device 1100 including a display device 1160 according to one embodiment of the inventive concepts.

Referring to FIG. 10, an electronic device 1100 may include a processor 1110, a memory device 1120, a storage device 1130, an input/output (I/O) device 1140, and a display device 1160. The electronic device 1100 may further include various ports capable of communicating with a video card, a sound card, a memory card, a USB device, or the like, or communicating with other systems.

The processor 1110 may perform specific calculations or tasks. According to one embodiment, the processor 1110 may be a microprocessor, a central processing unit (CPU), or the like. The processor 1110 may be connected to other components through an address bus, a control bus, a data bus, and the like. According to one embodiment, the processor 1110 may also be connected to an expansion bus such as a peripheral component interconnect (PCI) bus.

The memory device 1120 may store data used for an operation of the electronic device 1100. For example, the memory device 1120 may include a non-volatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), and a ferroelectric random access memory (FRAM), and/or a volatile memory device such as a dynamic random access memory (DRAM), a static random access memory (SRAM), and a mobile DRAM.

The storage device 1130 may include a solid state drive (SSD), a hard disk drive (HDD), a CD-ROM, and the like. The I/O device 1140 may include an input device such as a keyboard, a keypad, a touch pad, a touch screen, and a mouse, and an output device such as a speaker and a printer. The display device 1160 may be connected to other components through the buses or other communication links.

According to a pixel included in the display device 1160, an initialization transistor may not be turned on in a blank period of a low-frequency driving mode, so that the initialization transistor may be normally operated. In addition, according to the display device 1160, the initialization transistor of the pixel disposed in each of a main display area and a sub-display area may not be turned on in the blank period of the low-frequency driving mode, so that a display panel may display an image having uniform brightness.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A pixel comprising:

a light emitting element;

a driving transistor configured to control a driving current provided to the light emitting element; and an initialization transistor configured to provide a first initialization voltage to a gate of the driving transistor, and turned on in response to an initialization gate signal, wherein a voltage level of the first initialization voltage in a blank period of a low-frequency driving mode is higher than a voltage level of the first initialization voltage in the blank period of a high-frequency driving mode.

2. The pixel of claim 1, wherein a voltage level of the first initialization voltage in an active period of the low-frequency driving mode is substantially equal to a voltage level of the first initialization voltage in the active period of the high-frequency driving mode.

3. The pixel of claim 1, wherein the voltage level of the first initialization voltage in the blank period of the low-frequency driving mode is higher than a voltage level of the first initialization voltage in an active period of the low-frequency driving mode.

4. The pixel of claim 1, wherein a difference between the voltage level of the first initialization voltage in the blank period of the low-frequency driving mode and the voltage level of the first initialization voltage in the blank period of the high-frequency driving mode is substantially equal to a maximum voltage increase amount of the initialization gate signal in the blank period of the low-frequency driving mode.

5. The pixel of claim 1, wherein a Vgs voltage of the initialization transistor in the blank period of the low-frequency driving mode (where a Vgs voltage is a voltage level difference between a gate and a source) is substantially equal to a Vgs voltage of the initialization transistor in the blank period of the high-frequency driving mode.

6. The pixel of claim 1, wherein a driving frequency of the low-frequency driving mode is less than or equal to 60 Hz, and a driving frequency of the high-frequency driving mode is greater than or equal to 120 Hz.

7. The pixel of claim 1, wherein the driving transistor includes a PMOS transistor, and the initialization transistor includes an NMOS transistor.

8. The pixel of claim 1, wherein the driving transistor includes a polycrystalline silicon transistor, and the initialization transistor includes an oxide semiconductor transistor.

9. The pixel of claim 1, further comprising:

a write transistor configured to provide a data signal to a source of the driving transistor, and turned on in response to a write gate signal;

a compensation transistor connected between a drain and the gate of the driving transistor, and turned on in response to a compensation gate signal;

a first emission control transistor connected between a power supply voltage line configured to transmit a first power supply voltage and the source of the driving transistor, and turned off in response to an emission signal;

a second emission control transistor connected between the drain of the driving transistor and a first electrode of the light emitting element, and turned off in response to the emission signal;

a bypass transistor configured to provide a second initialization voltage to the first electrode of the light emitting element, and turned on in response to a bypass gate signal; and a storage capacitor connected between the gate of the driving transistor and the power supply voltage line.

10. The pixel of claim 9, wherein each of the write transistor, the first emission control transistor, the second emission control transistor, and the bypass transistor includes a PMOS transistor, and the compensation transistor includes an NMOS transistor.

11. The pixel of claim 9, wherein each of the write transistor, the first emission control transistor, the second emission control transistor, and the bypass transistor includes a polycrystalline silicon transistor, and the compensation transistor includes an oxide semiconductor transistor.

12. The pixel of claim 9, further comprising a bias transistor configured to provide a bias voltage to the source or the drain of the driving transistor, and turned on in response to the bypass gate signal.

13. A display device comprising:

a display panel including a plurality of pixels;

a gate driver configured to provide an initialization gate signal to the pixels; and a power supply configured to provide a first initialization voltage to the pixels, wherein each of the pixels includes:

a light emitting element;

a driving transistor configured to control a driving current provided to the light emitting element; and an initialization transistor configured to provide the first initialization voltage to a gate of the driving transistor, and turned on in response to the initialization gate signal, and wherein a voltage level of the first initialization voltage in a blank period of a low-frequency driving mode is higher than a voltage level of the first initialization voltage in the blank period of a high-frequency driving mode.

14. The display device of claim 13, wherein a voltage level of the first initialization voltage in an active period of the low-frequency driving mode is substantially equal to a voltage level of the first initialization voltage in the active period of the high-frequency driving mode.

15. The display device of claim 13, wherein the voltage level of the first initialization voltage in the blank period of the low-frequency driving mode is higher than a voltage level of the first initialization voltage in an active period of the low-frequency driving mode.

16. The display device of claim 13, wherein a difference between the voltage level of the first initialization voltage in the blank period of the low-frequency driving mode and the voltage level of the first initialization voltage in the blank period of the high-frequency driving mode is substantially equal to a maximum voltage increase amount of the initialization gate signal in the blank period of the low-frequency driving mode.

17. The display device of claim 13, wherein a Vgs voltage of the initialization transistor in the blank period of the low-frequency driving mode (where a Vgs voltage is a voltage level difference between a gate and a source) is substantially equal to a Vgs voltage of the initialization transistor in the blank period of the high-frequency driving mode.

18. The display device of claim 13, wherein a driving frequency of the low-frequency driving mode is less than or equal to 60 Hz, and a driving frequency of the high-frequency driving mode is greater than or equal to 120 Hz.

19. The display device of claim 13, wherein the display panel includes a main display area and a sub-display area, and a number of the pixels for each line of the main display area is greater than a number of the pixels for each line of the sub-display area.

20. The display device of claim 19, wherein the sub-display area includes a first sub-display area and a second sub-display area, which protrude from the main display area, and a notch area is formed between the first sub-display area and the second sub-display area.

* * * * *